United States Patent [19]

Gutner

[11] Patent Number: 4,995,682
[45] Date of Patent: Feb. 26, 1991

[54] STORAGE FACILITY FOR VIDEO CASSETTES

[76] Inventor: Kenneth H. Gutner, 4505 Lindenwood La., Northbrook, Ill. 60062

[21] Appl. No.: 225,182

[22] Filed: Jul. 28, 1988

[51] Int. Cl.$^5$ .................................................. A47B 81/00
[52] U.S. Cl. .................................... 312/311; 206/387; 312/341.1; 211/41
[58] Field of Search ............... 312/311, 330, 10, 12, 312/341 R, 348, 333, 341.1; 211/40, 41; 206/387

[56] References Cited

U.S. PATENT DOCUMENTS

| | | | |
|---|---|---|---|
| 1,371,253 | 3/1921 | Lynch | 211/41 X |
| 2,773,362 | 12/1956 | Scheitlin | 312/341 R |
| 3,138,416 | 6/1964 | Abramovich | 312/348 |
| 3,185,307 | 5/1965 | Higgins | 211/40 |
| 3,610,720 | 10/1971 | Hasmer | 312/330 |
| 4,121,878 | 10/1978 | Lokken | 312/341 R |
| 4,141,525 | 2/1979 | Miller | 312/330 R |
| 4,260,208 | 4/1981 | Lunho et al. | 312/311 |
| 4,304,449 | 12/1981 | Litchfield | 312/341 |
| 4,476,848 | 10/1984 | Protas | 312/311 X |
| 4,759,341 | 7/1988 | McFarland | 312/341 AR X |

FOREIGN PATENT DOCUMENTS

| | | | |
|---|---|---|---|
| 1170024 | 3/1957 | France | 211/41 |
| 1300129 | 12/1972 | United Kingdom | 312/10 |
| 2144029 | 2/1985 | United Kingdom | 312/330 R |

Primary Examiner—Joseph Falk
Attorney, Agent, or Firm—Tilton, Fallon, Lungmus & Chestnut

[57] ABSTRACT

A storage facility for video cassettes which employs a wire network carrier based on a generally rectangular perimetric frame with upstanding parallel horizontally spaced apart wire elements adapted to receive video cassettes between adjacent wire elements, the perimetric frame being equipped with slide means for cooperation with guide means in an entertainment center case for insertion and removal.

17 Claims, 4 Drawing Sheets

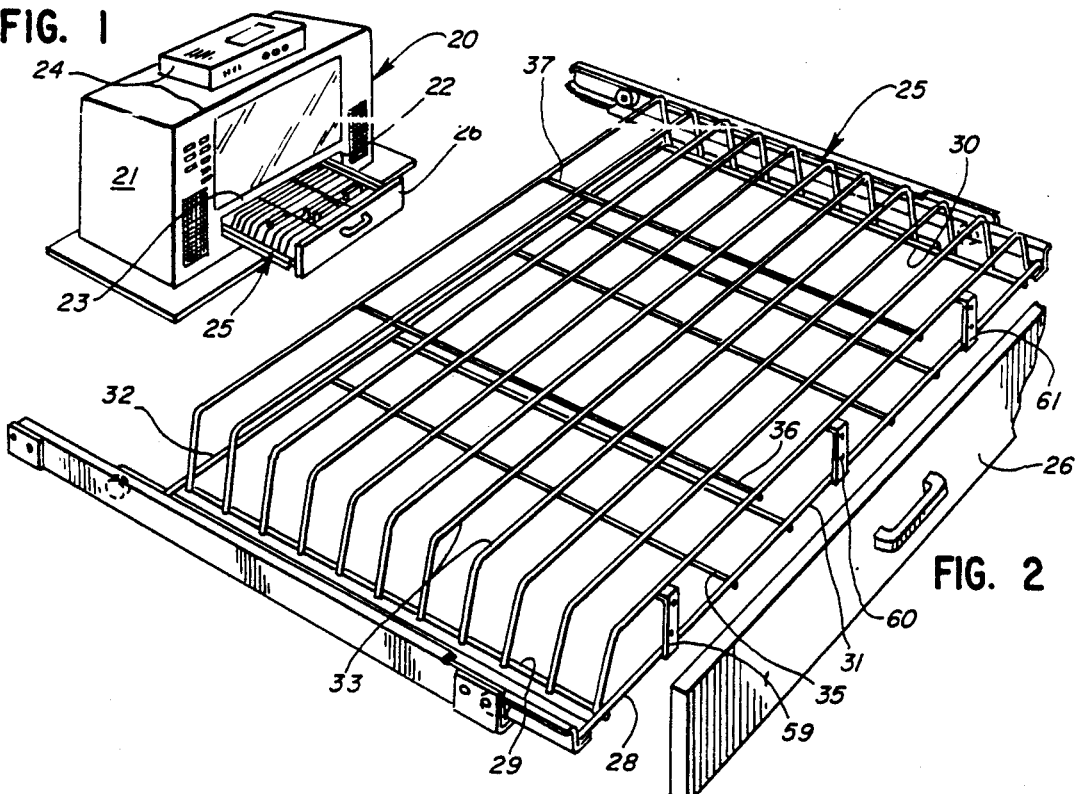
FIG. 1
FIG. 2
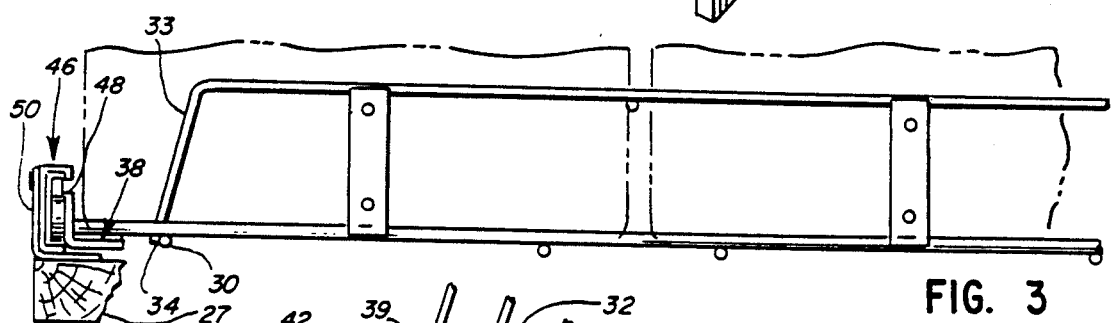
FIG. 3
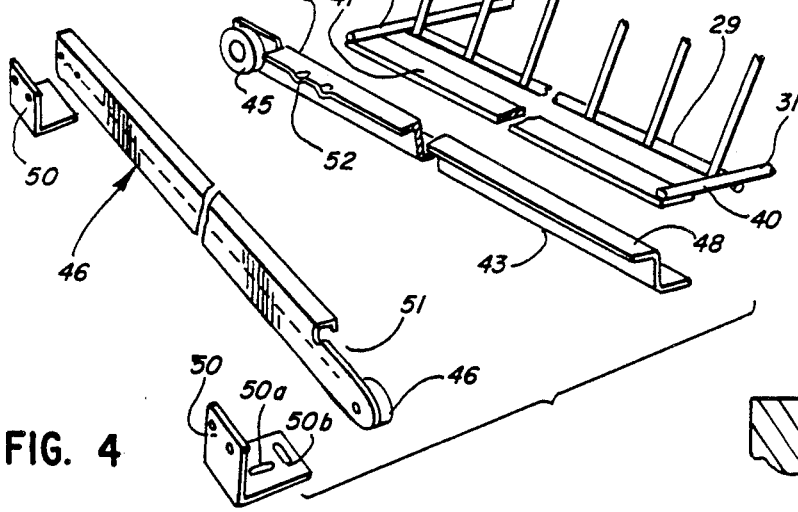
FIG. 4
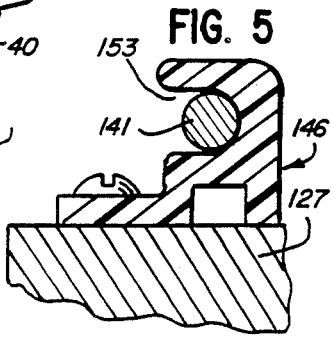
FIG. 5

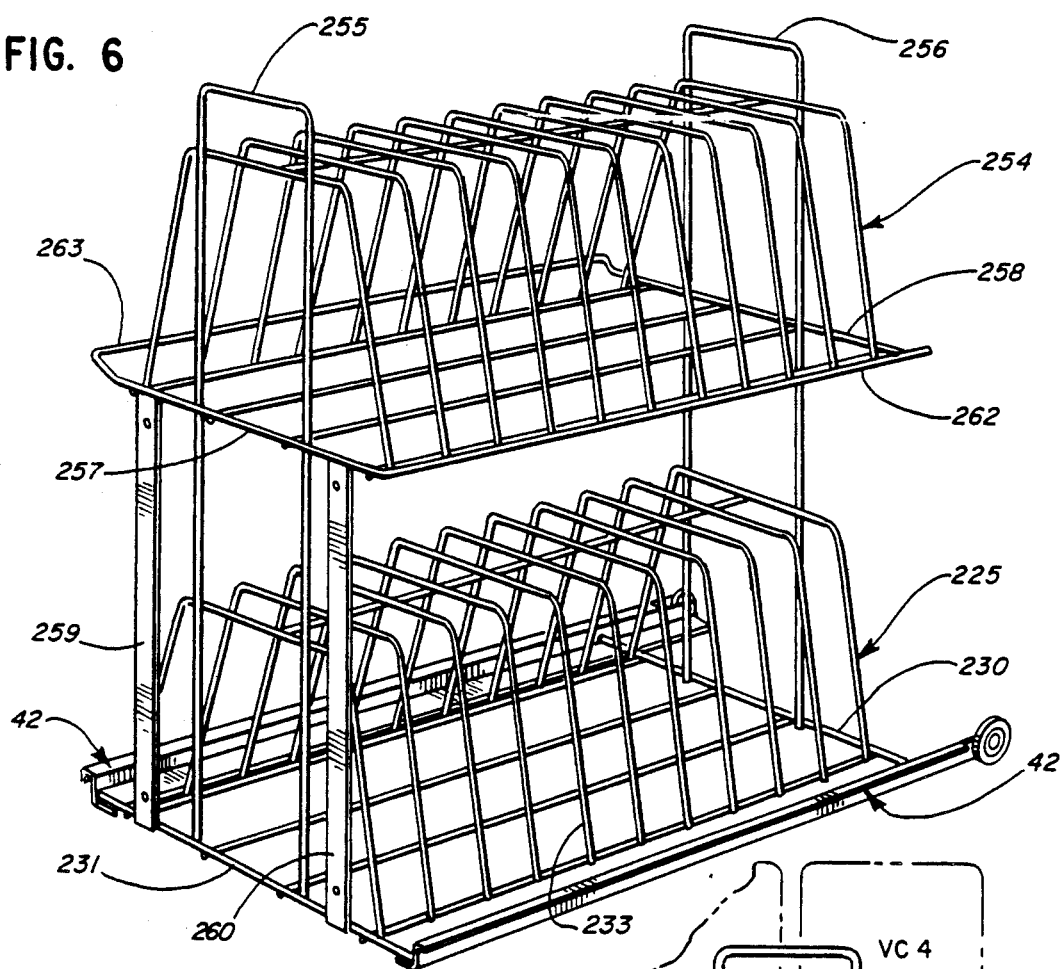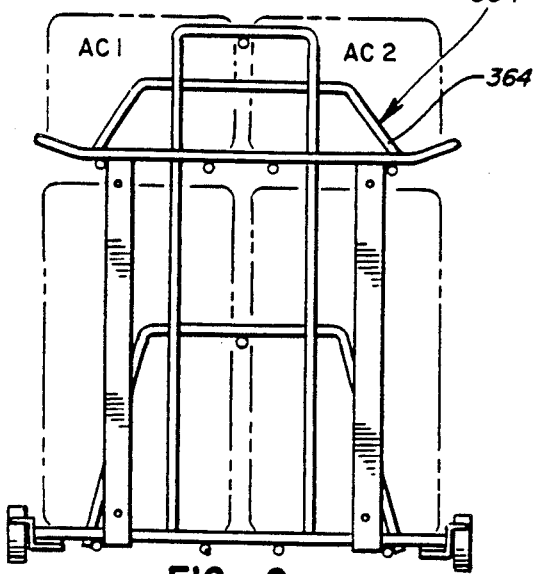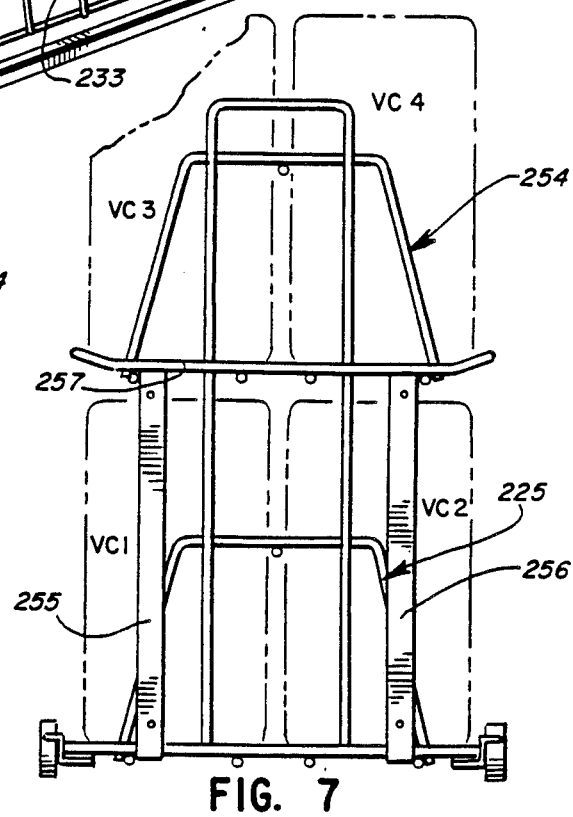

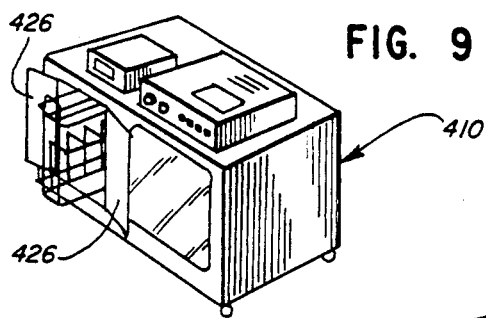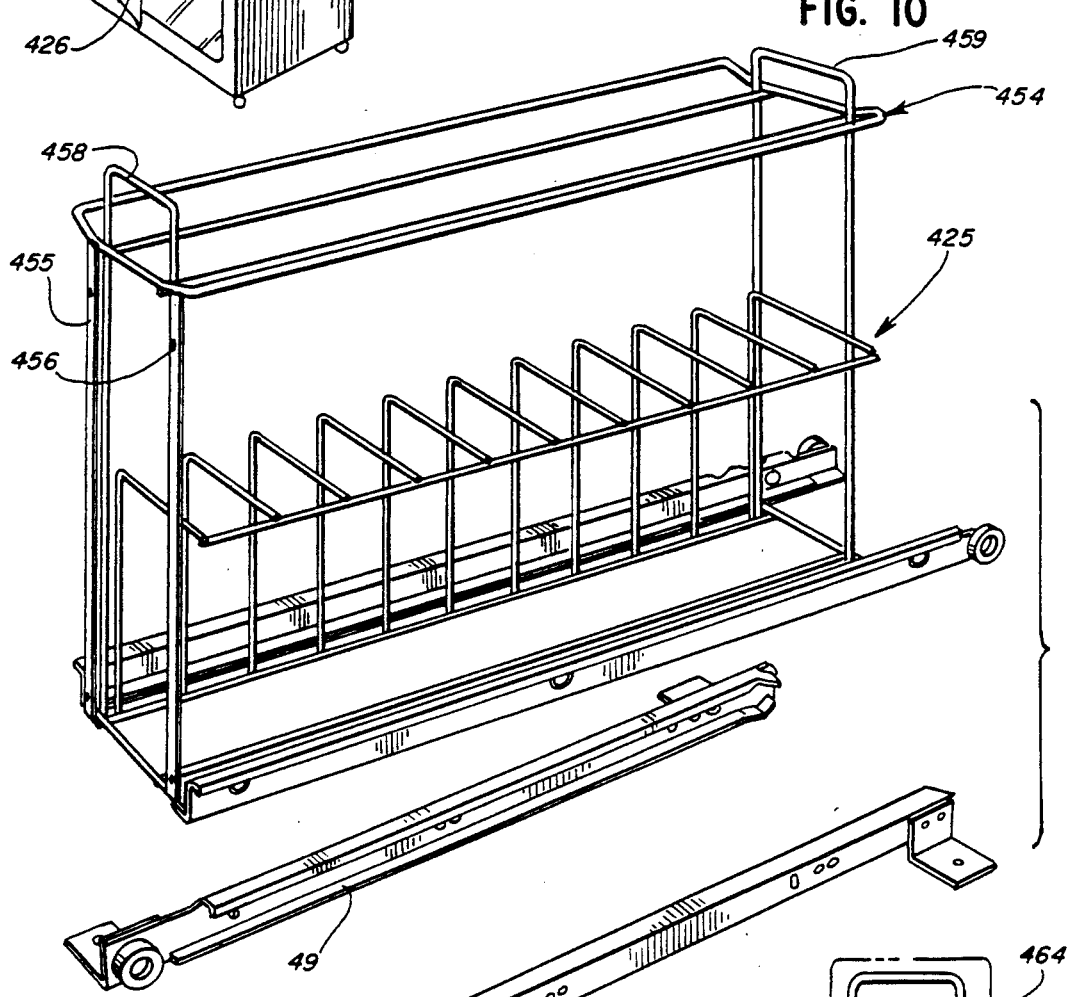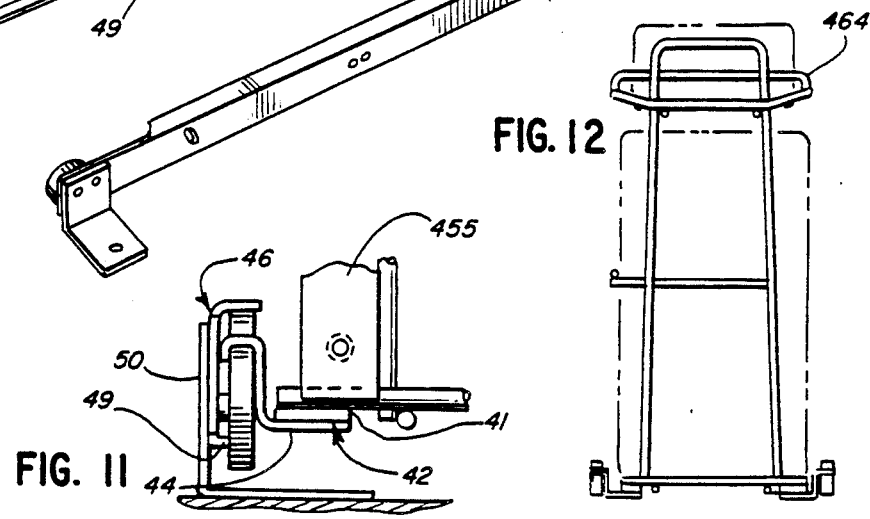

STORAGE FACILITY FOR VIDEO CASSETTES

BACKGROUND AND SUMMARY OF INVENTION

This invention relates to a storage facility for video cassettes and, more particularly, a structure including a wire carrier adapted to be slidably removed from a case—such as an entertainment center—for labeling, splicing, etc.

With the increasing popularity of video cassettes, it is not only desirable but necessary to provide convenient means for storing the same. Unsatisfactory attempts have been tried in the nature of compartmented drawers. These are not only heavy but expensive to construct and thus many people who have accumulated a number of video cassettes are left with no satisfactory storage facility.

The instant invention addresses both opportunities for providing suitable cassette storage. In one aspect, a sturdy, installed carrier is provided which is essentially a wire network provided by the manufacturer of the case or other entertainment center. The carrier which includes a generally rectangular perimetric frame made up of four wires comes equipped with a heavy duty slide assembly to be inserted and removed from guide means provided in the case. The carrier includes a plurality of upstanding generally U-shaped wire elements fixed to the perimetric frame and spaced apart so as to receive a plurality of either Beta or VHS in a box video cassettes. Thus, the owner can easily remove the carrier for transport to a convenient work area.

In another aspect, the invention addresses the lower cost market where the carrier is provided in knocked-down condition but ready-to-assemble. In this aspect, the generally rectangular perimetric frame is equipped with manifolds along two opposite sides for the installation of the upstanding generally U-shaped wire elements defining receiving spaces therebetween for video cassettes.

Advantageously, the carrier can be "tiered" as by superposing through column means, a second or more carriers in vertically spaced relation to the initial carrier. This opens the further opportunity for storing audio cassettes between adjacent wire elements, the audio cassettes having smaller external dimensions than the video cassettes.

In either event, the carrier can be provided with column means in the nature of vertically extending bars or the like so as to permit the fastening to the carrier of a pull-equipped drawer front. Thus, the owner has a finished storage facility that can fit within the existing opening of a case without the need of great expense and, more importantly, substantial weight.

The invention is described in connection with several embodiments in the accompanying drawing, in which—

FIG. 1 is a perspective view of a case, i.e., an entertainment center, equipped with the inventive carrier and shown with a pull-equipped drawer front attached thereto;

FIG. 2 is a fragmentary perspective view of the carrier assembly of FIG. 1 and enlarged relative thereto;

FIG. 3 is a fragmentary front elevational view of the showing in FIG. 2 but with the drawer front removed;

FIG. 4 is an exploded perspective view of one side of the carrier showing certain details of the slide and guide means associated therewith;

FIG. 5 is an enlarged fragmentary view of a modified form of slide and guide means useful in the practice of the invention and which also can serve as a stabilizing means where tiered carriers are employed;

FIG. 6 is a perspective view of yet another embodiment of the invention which illustrates a two-tiered assembly of carriers;

FIG. 7 is an end elevational view of the showing in FIG. 6 and with a plurality of video cassettes shown in dotted line;

FIG. 8 is a front elevational view of a modified form of the invention seen in FIG. 7 and which features audio cassettes (shown in dotted line) in the upper carrier;

FIG. 9 is a perspective view of another entertainment center and which shows yet another modification of the invention —this for installation with openable doors on the entertainment center case;

FIG. 10 is an exploded, enlarged perspective view of the carrier and associated guide means featured in FIG. 9;

FIG. 11 is an enlarged fragmentary front elevational view of the lower left hand corner of the exploded assembly of FIG. 10 and which features the slide and guide means;

FIG. 12 is an end elevational view of the carrier of FIG. 10 showing in dotted line a video cassette and on the upper carrier an audio cassette;

DETAILED DESCRIPTION

Figure 13:
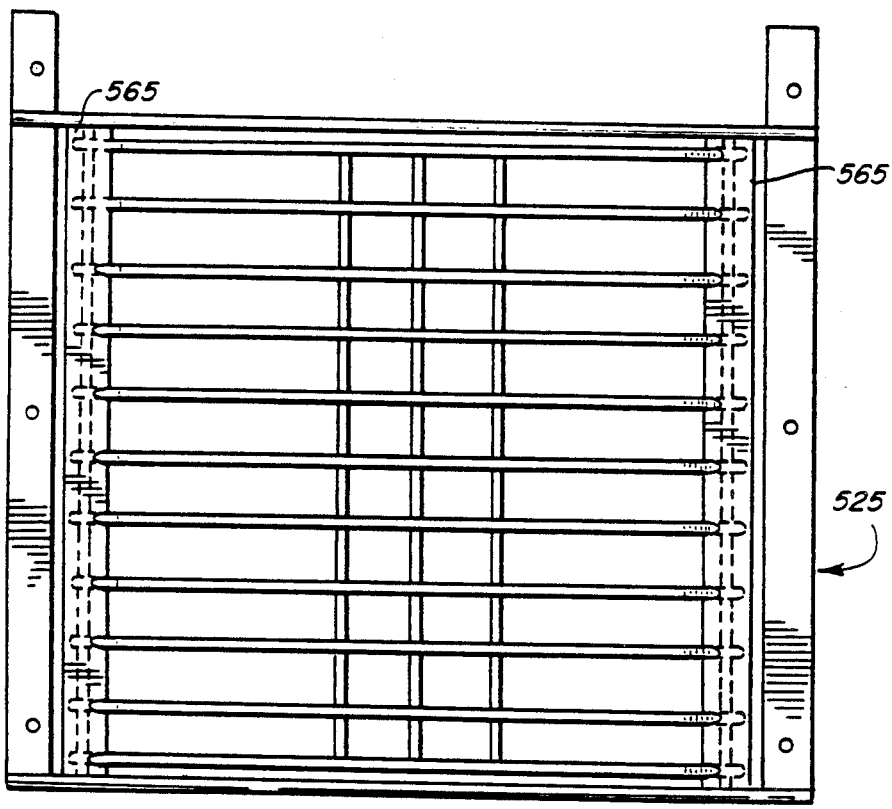
FIG. 13 is a top plan view of a modified version of the invention such as is suitable for knock down shipment and assembly in the home.

In FIG. 1, the numeral 20 designates generally an entertainment center which may take a variety of forms. Generally, however, the center 20 includes a case 21 which is equipped with a front opening leading to a cassette storage space 23. Optionally, the VCR/television 24 may be provided in or with the case 21. The inventive carrier generally designated 25 is seen to be equipped with a drawer front 26 for movement into and out of the storage space 23.

Reference is now made to FIG. 3 wherein the numeral 27 in the lower left designates a parting rail normally provided in a case equipped with a drawer. The parting rails—one at the front and one at the rear of the case may be part of the wall means defining the storage space. Details of the case construction are omitted inasmuch as the invention is adapted to be used in a variety of cases, depending upon the owner's choice.

The basic building means for the carrier 25 is a perimetric frame 28 defined by two pairs of opposed wire members as at 29 and 30 for those adjacent the sides of the opening, 31 adjacent the front of the storage space and 32 adjacent the rear of the storage space. It will be noted that the carrier 25 is sized to receive 30 video cassettes. This is brought about by providing 10 rows with three cassettes in each row. For example, in FIG. 3 which is only a fragmentary showing, a first cassette VC1 is seen to the left and a second cassette VC2 is arranged in end-to-end relation with VC1.

To define the slots or receiving areas for the video cassettes, I provide a plurality of generally U-shaped wire elements 33—see the left hand portion of FIG. 3. These are arranged in parallel, spaced apart relation as seen in FIG. 2 and each of the wire elements 33 is connected to a pair of opposed wire members as at 29 and 30. For example, the connection 34 seen at the lower left hand portion of FIG. 3 is advantageously achieved by spot welding and a similar connection is made relative to the wire member 30 at the other end of each wire element 33. Excellent results are achieved by using a ¼" diameter steel wire which may be coated with plastic, epoxy, etc. For a less expensive version, I prefer to paint the integrated wire assembly.

Also seen in FIGS. 2 and 3 are a plurality of further integrating wire members which extend fore and aft as at 35 and 36. These also can be advantageously spot-welded. In the case of the fore and aft members 35, these are connected between the other two wire members forming the perimetric frame 28 as at 31 and 32. The wire member 36 and its companion 37—see the upper central portion of FIG. 2—are connected to each of the generally U-shaped wire elements 33. In addition to rigidifying the carrier 28, the fore and aft members 36, 37 also define the slots for the receipt of the video cassettes—compare the relationship of the member 36 in the upper central portion of FIG. 3 with the outlines of the cassettes VC1 and VC2.

Sideways shifting of the end cassettes (as at VC1 in FIG. 3) is inhibited by the provision of the slide means generally designated 38—see the lower left portion of FIG. 3. The slide means can be better appreciated from a consideration of the exploded view in FIG. 4.

In the upper right hand portion of FIG. 4, it will be seen that the wire members 31, 32 are extended horizontally beyond the fore and aft wire member 29 to provide integral extensions 39 and 40. Fixed to the extensions 39 and 40 is a bar 41 which serves to connect the slide generally designated 42. The slide 42 includes an angled bracket 43 of generally Z-shaped cross section. The lower horizontal bar 44 of the bracket 43 is secured by riveting, welding, etc. to the bar 41 on the underside thereof as can be appreciated from the lower right portion of FIG. 11. At its rearward end, the slide 42 is equipped with a roller 45 which provides an anti-friction engagement with the guide means generally designated 46—see the lower left portion of FIG. 4. The guide means 46 is generally C-shaped—again, refer to FIG. 11 for an end elevational view. At its forward end, referring again to FIG. 4, the guide means is equipped with a cooperating roller 47 to complete the anti-friction mounting of the carrier 25 on the guide means 46. As can be appreciated from a comparison of FIGS. 2, 4 and 11, the weight of the forward end of the carrier 25 is placed on the roller 47 by virtue of the upper horizontal flange 48 of the slide 42. The weight of the rear of the carrier 25 is transmitted via the roller 45 to the lower leg of the C-shaped guide means 46—see the portion designated 49 in FIGS. 10 and 11.

In turn, the guide means 46 is secured by angle clips 50 to the parting rails—see particularly the extreme left hand portion of FIG. 3 where the front parting rail 27 is seen in fragmentary form. The clips 50 are equipped with slots 50a and 50b as seen in FIG. 4 for ready adjustment of the mounting of the carrier assembly in the case.

To facilitate removal of the carrier, the upper portion of the guide means 46 is cut away as at 51—see the lower left hand portion of FIG. 4. This permits the extraction of the roller 45 incident to upward pivoting of the carrier 25. It will be appreciated that an identical but mirror imaged arrangement is provided at the right hand portion of the carrier 25.

To indicate to the owner that the drawer is substantially fully extracted from the case, overcomeable stop means 52 are provided in the slide 42—see the upper central portion of FIG. 4. These are depressions provided in the upper bar 48 of the bracket 43 adjacent the rear end thereof, but forwardly of the roller 45. The stop means 52 provide the signal for maximum extraction by engaging the roller 47 at the forward end of the guide means 45—see the lower central portion of FIG. 4. To remove, the carrier forward end is privoted upwardly for the stop means 52 to clear the roller 47 at which time the rear roller 45 can passs through the slot 51.

Slide/Guide Modification

Reference is made here to FIG. 5 which is a fragmentary view showing a less expensive version of the slide/guide compared to that shown in FIG. 1-4. In FIG. 5, the numeral 127 designates a wall of the carrier-receiving opening and secured thereto is a modified guide means generally designated 146. The guide means 146 is advantageously constructed of plastic material in the form of an elongated plastic block secured by screws or other means to the wall bottom 127. The guide means 146 is equipped with a sidewardly facing groove 153 which receives in bearing engagement the side portion of a fore and aft wire member 141 which is located similarly to the bar 41 of FIGS. 2-4. Here, the cross wire elements are arranged in the same way as in FIGS. 2-4. A suitable detent can be associated with the groove 153 to provide an overcomeable stop means.

As will be brought out hereinafter, the same arrangement of slide/guide can be employed on upper tiers of carriers for stabilization.

Reference is now made to FIG. 6 where a two-tier construction is depicted. The lower carrier 225 has the same basic construction as that seen with reference to the embodiment in FIGS. 1-4. However, here, the length of the generally U-shaped wire elements 233 is somewhat shorter and thus the carrier 225 is arranged to contain 20 video cassettes. However, the upper carrier generally designated 254 accommodates 20 additional cassettes, making this embodiment capable of supporting 40 video cassettes. This can be appreciated from a consideration of FIG. 7 where the cassettes are designated VC1-4.

Column Means

For achieving the tiered arrangement, I provide column means in the nature of vertically extending generally U-shaped wires 255 and 256 (see FIG. 6). These are connected between the front and rear wire members 231 and 230 of the lower carrier 225 and the counterpart members 257 and 256 on the upper carrier 254. The upper portions of the U-shaped column means 255 and 256 serve as handles for carrying the heavier assembly and for pulling the column means 255 serves as a handle for pulling the carrier out and pushing the carrier in.

Additionally bar means 259 and 260 are provided for mounting a pull-equipped drawer front although in the embodiment illustrated, I prefer to utilize this in a case having openable doors as seen in FIG. 9. However, where 3 or 4 tiers of carriers are employed—as for 80 cassettes—I use the drawer front for additional stabilization.

In the event a drawer front is desired, the connection can be that illustrated in FIG. 2 where the drawer front 26 is connected to the vertical bars 59, 60 and 61.

Shift Preventing Means

As indicated previously, the slides as at 42 restrict the sideways movement of cassettes in the lower carrier 225. To provide the same type of confinement or restraint, I angle the front and rear wire members 257, 258 of the upper carrier 254 so that the fore and aft wire members 262, 263 are somewhat elevated relative to the plane defined by the rest of the perimetric frame and fore and aft members.

Audio Cassette Embodiment

Reference is now made to FIG. 8 which is essentially similar to the showing in FIG. 7 except for the fact that the wire elements 364 of the upper carrier generally designated 354 have a much lesser height so as to accommodate audio cassettes as at AC1 and AC2.

If stabilization is required by the height of the two or more stacked carrier assemblies, the arrangement of FIG. 5 can be advantageously employed whereby the right and left fore and aft members are free of any obstructions on their lower portions so as to be able to ride in a groove-equipped elongated guide means.

Modification for Door-Equipped Case

Reference is now made to FIG. 9 where the numeral 410 designates generally a somewhat different type of entertainment center—one that is equipped with openable doors 426. This can accommodate a relatively tall, narrow carrier assembly such as is designated 425 relative to the lower carrier and 454 relative to the upper carrier. In this connection, the cross wires have been omitted for ease of understanding but it will be appreciated that lesser height wires are employed as seen in the upper portion of FIG. 12 as at 464 to accommodate audio cassettes. These can have different spacings dependent on whether audio cassettes or discs are to be stored. The embodiment of FIGS. 10-12 insofar as the slide/guide means is concerned is identical to that of FIGS. 1-4, reference having been previously made to the showing in FIG. 11.

In the event the openable doors 426 are not either desired or provided, it is possible to install a door front on the assembly of FIG. 10 through the use of the column means 455, 456.

Knocked Down Assembly

Figure 14:
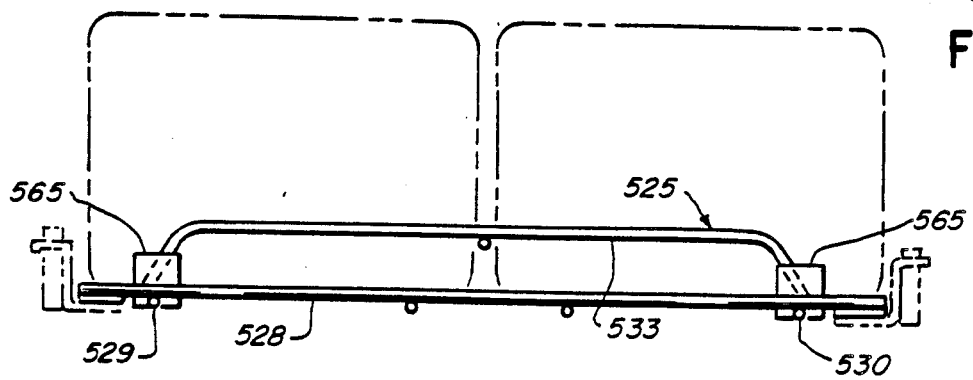
FIG. 14 is a front elevational view of the carrier assembly of FIG. 13.

Reference is now made to FIGS. 13 and 14 which show a different type of carrier 525. Again, however, the basic building block of a generally rectangular perimetric frame 528 is employed. However, the fore and aft wire members 529 and 530 have rigidly attached thereto manifolds 565. Each manifold is advantageously a plastic or wood block or a flat metal strip drilled with holes at equal horizontal spacings for the receipt of the ends of the wire elements 533. Thus, the entire carrier can be shipped in a lay flat condition for ready assembly at the cassette owner's home. Also, in this embodiment, I prefer to use U-shaped wire elements which are only 1" high as contrasted to the 2" high wire elements 33, etc.

Figure 15:
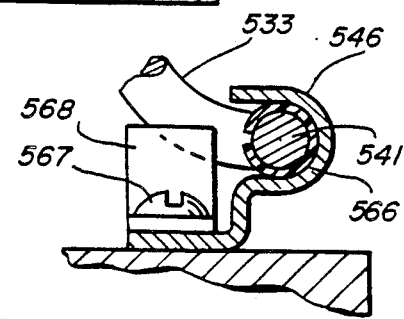
FIG. 15 is a view similar to FIG. 5 but of a modified form of the invention.

Another modification is seen in FIG. 15 which achieves economies in fabrication and shipment. The guide means 546 is a metal extrusion. To reduce the frictional engagement of the wire 541, I employ a split plastic sleeve 566 ensleeved on the wire 541—or an extra heavy coating of epoxy or other plastic may be employed. Further, the screw or bolt 567 can provide an advantageous means for mounting an L-shaped overcomeable stop 568 for coaction with the wire 533 attached to the wire 541. This also has the advantage of simplicity for installation when the inventive carrier is provided in knocked-down condition.

While in the foregoing specification a detailed description of the invention has been set down for the purpose of explanation, may variations in the details hereingiven may be made by those skilled in the art without departing from the spirit and scope of the invention.

I claim:

1. A storage facility for video cassettes comprising a case having storage space for cassettes defined by wall means accessible through front openable means, a pair of horizontally spaced apart guide means on said wall means extending rearwardly from said front opening means, a carrier for said cassettes equipped with horizontally spaced apart slide means in said space with said slide means being mounted in said guide means, said guide means having withdrawal means whereby said carrier can be withdrawn from said space, said carrier including a generally rectangular perimetric frame having said slide means fixed thereto and a plurality of spaced apart, parallel generally U-shaped wire elements extending across said perimetric frame form one side to the other to provide a plurality of slots for receiving a plurality of cassettes in side-by-side relation, each of said wire elements being spaced from an adjacent wire element a distance to receive a boxed video cassette, and straight wire member means secured to the underside of said frame and extending parallel to said slide means for supporting said cassettes, said carrier perimetric frame including four wire members interconnected to form a rectangle, said wire elements being fixed to two opposed wire members, said two opposed wire members being operably associated with said guide means, the other two of said wire members being extended beyond the first mentioned wire members to provide support means for said slide means, and a slide assembly fixed to said support means.

2. The structure of claim 1 in which said slide assembly includes a bar extending parallel the adjacent one of said first mentioned two wire members and fixed to said support means, said assembly also including a horizontally elongated angle bracket fixed to said bar and equipped with anti-friction means for cooperative action with said guide means.

3. The structure of claim 2 in which said guide means also includes a horizontally elongated angle bracket equipped with anti-friction means for cooperative action with said slide means.

4. The structure of claim 3 in which said anti-friction means includes a roller at the rear of said slide bracket and a roller at the front of said guide bracket.

5. The structure of claim 4 in which said guide bracket is equipped with a slot for forward and sideward adjustment to permit passage of said slide bracket roller incident to carrier removal from said case.

6. The structure of claim 5 in which said slide bracket is equipped with overcomeable stop means adjacent the rear thereof but spaced forwardly of said slide roller, said guide bracket roller cooperating with said stop means to signal the limit of horizontal forwardly movement of said carrier.

7. The structure of claim 6 in which said case sidewall means include drawer-supportive parting rails, and angle clips securing said guide mans to said parting rails.

8. A storage facility for video cassettes comprising a case having a storage space for cassettes defined by wall means accessible through front openable means, a pair of horizontally spaced apart guide means on said wall means extending rearwardly from said front opening means, a carrier for said cassettes equipped with horizontally spaced apart slide means in said space with said slide means being mounted in said guide means, said guide means having withdrawal means whereby said carrier can be withdrawn from said space, said carrier including a generally rectangular perimetric frame having said slide means fixed thereto and a plurality of spaced apart, parallel generally U-shaped wire elements extending across said perimetric frame form one side to the other to provide a plurality of slots for receiving a plurality of cassettes in side-by-side relation, each of said wire elements being spaced from an adjacent wire element a distance to receive a boxed video cassette, and straight wire member means secured to the underside of said frame and extending parallel to said slide means for supporting said cassettes, said carrier perimetric frame including four wire members interconnected to form a rectangle, said wire elements being fixed to two opposed wire members, said two opposed wire members being operably associated with said guide means, the other two of said wire members being extended to provide integral extensions, slide wire means connected to said extensions, said guide means including a pair of horizontally elongated groove plastic blocks secured to said wall means and receiving said slide wire means.

9. A storage facility for video cassettes comprising a case having a front opening and a storage space extending into said case from said front opening, horizontally aligned drawer-supporting parting rails on each side of said space, a guide member fixed to each parting rail, a carrier slidably supported on said guide members and including a generally rectangular perimetric horizontally disposed frame equipped with horizontally spaced apart slide members received in said guide members, a plurality of upstanding generally U-shaped wire elements connected to said perimetric frame adjacent said slide members, said wire elements being disposed parallel to each other and spaced apart a distance to receive a boxed video cassette, straight wire member means secured to the underside of said frame and extending parallel to said guide members for supporting said cassettes, vertical bar means extending between said perimetric frame and the frontmost of said wire elements, and a pull-equipped drawer front secured to said bar means and sized to close said front opening stabilizing means being provided in said case for at least one of said supported plurality of carriers, a pair of horizontally spaced grooved plastic blocks being secured to said case in aligned relation with said at least one of said supported plurality of carriers.

10. A storage facility of video cassettes comprising a case having a front opening and a storage space extending into said case from said front opening, side wall means defining said space, a pair of guide members fixed to said wall means in spaced, horizontally aligned relation, a carrier slidably supported on said guide members and including a generally rectangular perimetric frame providing two additional spaced apart wire members aligned with said guide members constituting slide means, each guide member including an elongated plastic block having a groove, said two wire members being received in said grooves, said carrier including a plurality of parallel, upstanding generally U-shaped wire elements extending between and connected to said perimetric frame, said U-shaped wire elements being horizontally spaced apart a distance sufficient to receive a boxed video cassette, and straight wire member means secured to the underside of said frame and extending parallel to said two additional spaced apart wire members for supporting said cassettes.

11. The structure of claim 10 in which said perimetric frame is equipped with a pair of spaced apart rearwardly extending manifolds each equipped with equally horizontally spaced openings for the receipt of the ends of said wire elements whereby said carrier is adapted to be shipped in knocked-down, generally lay-flat condition.

12. A carrier for video cassettes comprising a generally rectangular perimetric frame made up of four circular wires, two opposed of said wires being equipped with means for slidable receipt in guide means in a case, and a plurality of generally U-shaped wire elements extending between said two opposed wires and fixed thereto, said wire elements being arranged in parallel relation and spaced apart a distance to receive a boxed video cassette, the other two opposed wires extending beyond the first mentioned two wires to provide free wire extensions, a pair of slide assemblies mounted on said extensions for receipt in said guide means, and straight wire member means secured to the underside of said frame and extending parallel to said two opposing sides for supporting said cassettes.

13. The structure of claim 12 in which a third of said wires is equipped with bar means, and a pull-equipped drawer front mounted on said bar means.

14. The structure of claim 12 in which a third and fourth of said wires is each equipped with column means, and a second carrier is fixed to said column means in vertically spaced relation to the first mentioned carrier.

15. The structure of claim 14 in which said second carrier is arranged and constructed to support a plurality of audio cassettes.

16. The structure of claim 12 in which said U-shaped wire elements each have a length sufficient to accommodate a plurality of video cassettes in end-to-end relation between adjacent wire elements.

17. A storage facility for video cassettes comprising a case having storage space for cassettes defined by wall means accessible through front openable means, a pair of horizontally spaced apart guide means on vertical ones of said wall means extending rearwardly from said front opening means, a carrier for said cassettes equipped with horizontally spaced apart slide means in said space with said slide means being mounted in said guide means, said guide means having withdrawal means whereby said carrier can be withdrawn from said space, said carrier including a generally rectangular perimetric frame having said slide means fixed thereto and plurality of spaced apart, parallel generally U-shaped wire elements extending across said perimetric frame from one side to the other to provide a plurality of slots for receiving a plurality of cassettes in side-by-side relation, said guide means including shaped metal extrusion having said slide means slideably mounted therein, screw means securing said guide means to said case, overcomeable stop means for said carrier also secured by said screw means to said case, and straight wire member means secured to the underside of said frame and extending parallel to said slide means for supporting said cassettes.

* * * * *